United States Patent
Kurtz et al.

(10) Patent No.: US 12,258,146 B2
(45) Date of Patent: Mar. 25, 2025

(54) PALLET TRAILER AND METHOD FOR LOADING AND UNLOADING CARGO AIRCRAFT

(71) Applicant: Government of the United States, as represented by the Secretary of the Air Force

(72) Inventors: Logan Kurtz, Eagle River, AK (US); Nichole Kurtz, Eagle River, AK (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 331 days.

(21) Appl. No.: 17/739,760

(22) Filed: May 9, 2022

(65) Prior Publication Data

US 2023/0139589 A1    May 4, 2023

Related U.S. Application Data

(60) Provisional application No. 63/214,962, filed on Jun. 25, 2021.

(51) Int. Cl.
*B64F 1/32* (2006.01)
(52) U.S. Cl.
CPC .................................. *B64F 1/322* (2020.01)
(58) Field of Classification Search
CPC ............................... B65F 1/322; B60P 1/6436
See application file for complete search history.

(56) References Cited

U.S. PATENT DOCUMENTS

| | | | | |
|---|---|---|---|---|
| 2,834,495 A * | 5/1958 | Norbom | ............... | B60P 1/6436 414/537 |
| 3,490,626 A * | 1/1970 | Kirk | ......................... | B60P 7/13 410/80 |
| 4,541,768 A * | 9/1985 | Walker | .................... | B64F 1/322 414/535 |
| 4,787,808 A * | 11/1988 | Shimoji | .................... | B62B 3/04 414/536 |
| 5,478,189 A * | 12/1995 | Agtuca | ..................... | B60P 1/52 D34/12 |
| 5,865,579 A | 2/1999 | Thomas | | |
| 6,817,578 B1 | 11/2004 | Garcia et al. | | |
| 8,313,278 B2 | 11/2012 | Simmons et al. | | |
| 8,851,488 B2 * | 10/2014 | Carruyo | .................... | B62B 1/12 410/52 |
| 9,592,845 B2 * | 3/2017 | Palma | ...................... | B62B 3/108 |
| 9,945,753 B2 | 4/2018 | Nelson | | |
| 11,117,605 B2 * | 9/2021 | Eckerley | ................... | B62B 3/02 |
| 2004/0247422 A1 | 12/2004 | Neumann et al. | | |
| 2015/0184416 A1 | 7/2015 | Cochran et al. | | |
| 2019/0300235 A1 | 10/2019 | Jefferson | | |
| 2021/0009023 A1 * | 1/2021 | Hoeper | ................. | B60P 7/0892 |

* cited by examiner

*Primary Examiner* — Jonathan Snelting
(74) *Attorney, Agent, or Firm* — AFMCLO/JAZ; Jeffrey V. Bamber

(57) ABSTRACT

A trailer for moving pallets on and off cargo aircraft is disclosed. The trailer includes a deck having a top surface that defines a top plane. The top of the deck has at least one pair of spaced apart forklift clearance channels therein that are disposed below the top plane of the deck and extend inward from at least one of the sides of the deck. Methods for loading and unloading pallets on and off cargo aircraft are also disclosed.

14 Claims, 7 Drawing Sheets

PALLET TRAILER AND METHOD FOR LOADING AND UNLOADING CARGO AIRCRAFT

Pursuant to 37 C.F.R. § 1.78(a)(4), this application claims the benefit of and priority to prior filed co-pending Provisional Application Ser. No. 63/214,962, filed Jun. 25, 2021, which is expressly incorporated herein by reference.

RIGHTS OF THE GOVERNMENT

The invention described herein may be manufactured and used by or for the Government of the United States for all governmental purposes without the payment of any royalty.

FIELD OF THE INVENTION

The present invention relates generally to trailers for moving pallets and, more particularly, to trailers and methods for loading and unloading pallets on and off cargo aircraft.

BACKGROUND OF THE INVENTION

Prior methods of loading military cargo aircraft such as a C-17 and a C-130 involve using large all-terrain forklifts, Halverson loaders, and Tunner loaders to load and unload pallets containing the cargo. The cargo is often carried on 463L Air Cargo pallets and Internal Slingable Unit (ISU) air mobile containers. The 463L Air Cargo pallet is a lightweight aluminum-skinned rectangular pallet having flat top and bottom surfaces and a series of horizontal tongues extending horizontally about its periphery. The 463L Air Cargo pallet has dimensions of 108 inches by 88 inches.

If the destination of the aircraft does not have forklifts or other material handling equipment (MHE), the large all-terrain forklifts would be loaded onto the aircraft so that the cargo could be unloaded from the aircraft at the destination. The large all-terrain forklifts would occupy a considerable amount of cargo space on the aircraft that could be better used for other cargo. In addition, the operation of the large all-terrain forklifts requires operators with specialized training.

A need, therefore, exists for equipment for moving cargo on pallets and, more particularly, to equipment and methods for loading and unloading pallets of cargo on and off cargo aircraft, particularly when the destination of the aircraft does not have material handling equipment.

SUMMARY OF THE INVENTION

The present invention relates generally to trailers for moving pallets and, more particularly, to trailers and methods for loading and unloading pallets on and off cargo aircraft.

While the invention will be described in connection with certain embodiments, it will be understood that the invention is not limited to these embodiments. To the contrary, this invention includes all alternatives, modifications, and equivalents as may be included within the spirit and scope of the present invention.

According to one embodiment of the present invention a pallet trailer is provided having a deck and a plurality of wheels that are at least indirectly joined to the deck. The top of the deck defines a top plane, and at least one pair of spaced apart forklift clearance channels (or tine troughs) are provided in the top of the deck that are disposed below the top plane of the deck and extend inward from at least one of the sides of the deck. The pallet trailer has a plurality of wheels located underneath the bottom of the deck. The wheels are rotatable on axles that are joined at least indirectly to the bottom of the deck.

While the pallet trailer can be used for many purposes, in one embodiment, the pallet trailer is a purpose built, front steering axle trailer designed specifically for the task of loading, offloading and moving the 463L, Master Pallet and its derivatives. The pallet trailer features a low deck height, forklift channels, high load to weight ratio, a pallet clamping system, and design elements required for use on military cargo aircraft. The pallet trailer length and width dimensions may be within the overall dimensions of the 463L pallet position for minimum load spacing on cargo aircraft. The pallet position on the aircraft is slightly larger than the pallet itself.

The pallet trailer is designed to transport 463L pallets and ISU containers on and off aircraft, and also on the ground. It is particularly useful when there is limited or no material handling equipment (MHE) available. The pallet or ISU container is loaded onto the trailer which can transport the pallets and ISUs onto an aircraft and over rough terrain if needed. The trailer may be winched on and off of the aircraft so that no MHE is required. With the increase in combat exercises and deployments to austere locations, the pallet trailer allows for fast precise movements. The trailer fulfills a similar requirement when it comes to emergency management and/or disaster relief. The trailer can also be used to transport pallets between locations on the ground, such as at a military base.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The present invention relates generally to trailers for moving pallets and, more particularly, to trailers and methods for loading and unloading pallets on and off cargo aircraft. It should be understood, however, that the trailer of the present invention can be used for many other purposes as described more fully herein.

Figure 1:
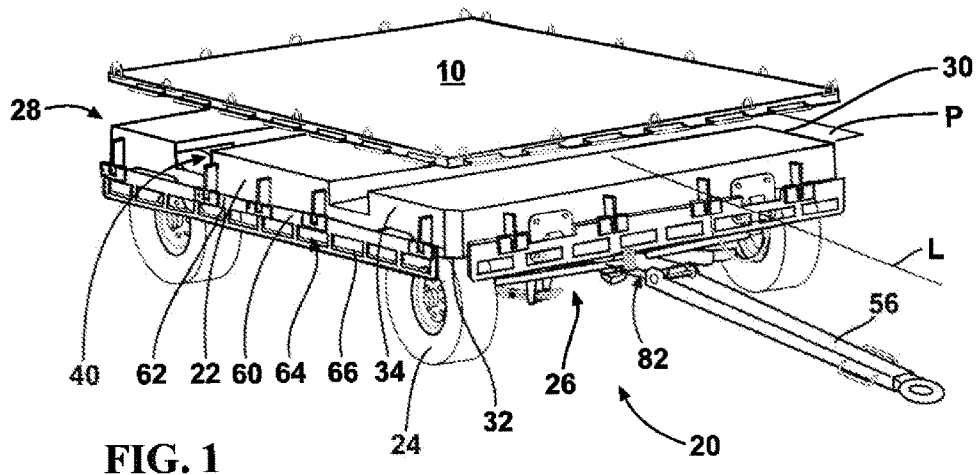
FIG. 1 is a perspective view of one embodiment of the pallet trailer.

FIG. 1 shows one non-limiting embodiment of a pallet trailer according to the present invention with a 463L pallet 10 disposed above the trailer. The pallet trailer 20 comprises a deck 22 and a plurality of wheels 24 located underneath the bottom of the deck 22. The wheels 24 are rotatable on axles that are joined at least indirectly to the bottom of the deck. The pallet trailer 20 has a front end 26, a rear end 28, and a longitudinal centerline L running between the front end 26 and the rear end 28.

The deck 22 has a top 30, a bottom 32, and sides designated generally by reference number 34. The top 30 of the deck 22 comprises an uppermost portion that lies in a top plane P. The top 30 of the deck 22 has at least one pair of spaced apart forklift clearance channels (or tine troughs) 40 therein that are disposed below the top plane P of the deck 22 and extend inward from at least one of the sides 34 of the deck. The channels 40 may be of any dimensions and spacing that are suitable for allowing the tines of a forklift to fit therein. In some embodiments, the channels 40 may be from about 10⅜ to about 10½ inches wide. In some embodiments, the channels 40 may have a center-to-center spacing that is between about 47 inches and about 47¼ inches. In some embodiments, the sides of the channels 40 may be spaced apart between about 36½ inches and about 36⅝ inches. In some embodiments, the top surface of the channels 40 may be from about 3 inches to about 5 inches spaced below the top plane P of the deck 22.

Figure 2:
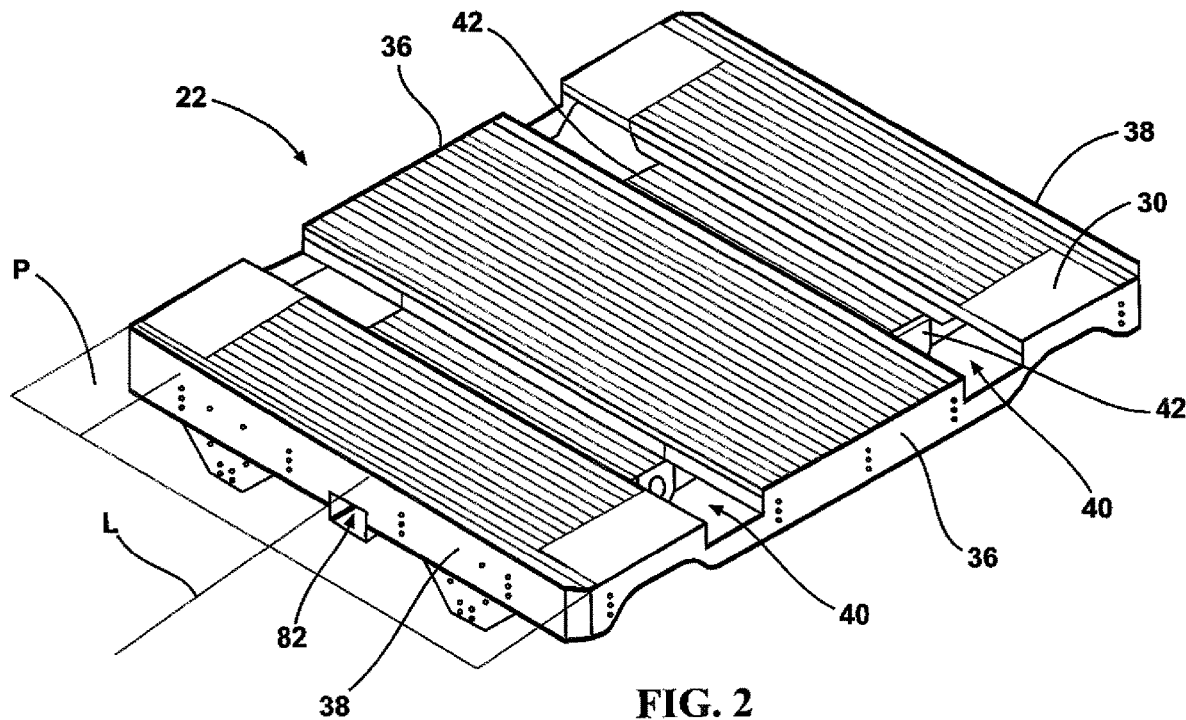
FIG. 2 is a perspective view of one embodiment of the deck of the pallet trailer.

The deck 22 may be of any suitable size and configuration. The 463L pallet 10 is 108 inches long and 88 inches wide. The deck 22 shown in FIG. 1 has a rectangular plan view configuration with four sides 34. In one embodiment, the deck is 104 inches long and 84 inches side. FIG. 2 shows that the sides 34 comprise a first pair of opposing sides, longitudinal sides 36, and a second pair of opposing sides, laterally-oriented sides (or "lateral sides") 38 at the ends of the trailer 20. The lateral sides 38 may alternatively be referred to as the front and back sides of the deck. The forklift clearance channels 40 extend between one pair of opposing sides. Typically, the forklift clearance channels 40 will extend between the longitudinal sides 36 of the deck. In the embodiment shown in FIG. 2, the sides of the deck may comprise portions 42 in the forklift channels 40 that are recessed inwardly toward the longitudinal centerline L.

The deck 22 may be made by any suitable process, and may be made of any suitable material. In one embodiment, the pallet trailer has a 6061-T6 aluminum deck that comprises components that are welded to form a one piece structure. Two ¼-inch-thick wall×4 inch square tubes make up the main structure of the deck. Hollow, center webbed, extruded aluminum decking panels, each 9 inches wide×1.5 inches thick and interlocking, laid crosswise front to back, make up the top surface 30 of the deck. The use of extruded aluminum decking allows for an overall lower profile design while increasing strength and reducing fabrication costs. A layer of material such as Ultra High Molecular Weight Polyethylene (UHMW) may be joined to the top surface 30 of the aluminum decking so that the metal pallets (such as 463L pallets) do not contact the metal trailer. The layer of material may be joined to the top surface 30 of the aluminum decking in any suitable manner, including but not limited to by riveting the same to the top surface 30.

Figure 3:
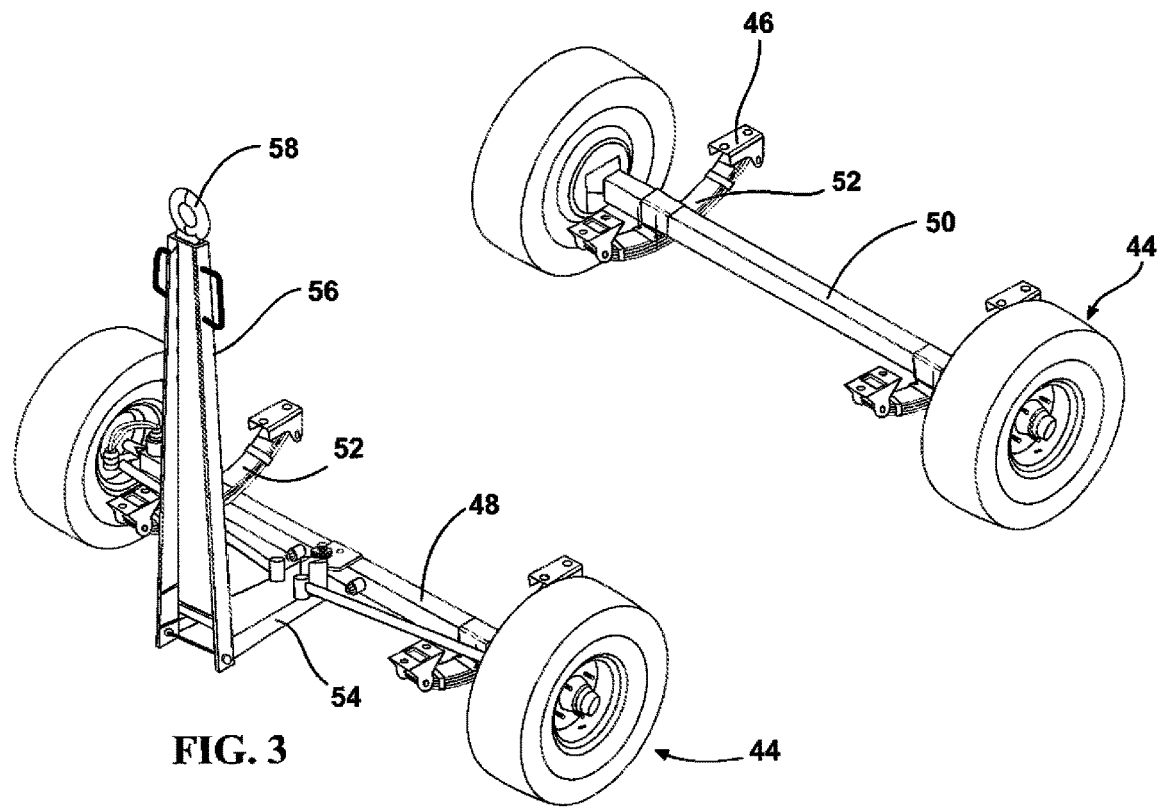
FIG. 3 is a perspective view of axle assemblies for the pallet trailer.

FIG. 3 shows the axle assemblies (or "rolling gear") 44 of the pallet trailer. In some embodiments, steel components may make up the suspension mounting assemblies 46 that connect the rolling gear to the deck 22. The rolling gear comprises two steel tube axles 48 and 50, each rated at 12,000 lbs., with suspension provided by conventional leaf springs 52. The front axle 48 is a center arm 54 steerable axle with a draw bar 56 for connecting the pallet trailer 20 to a tow vehicle. The draw bar 56 can comprise any suitable type of connection for the tow vehicle. In the embodiment shown, the draw bar 56 has a pintle hitch 58 on its distal end. The rear axle 50 is a straight axle with a manual drum parking brake system. The wheels 24 can comprise any suitable tires such as 7.5-10 NHS tires from Specialty Tires of America.

Figure 4:
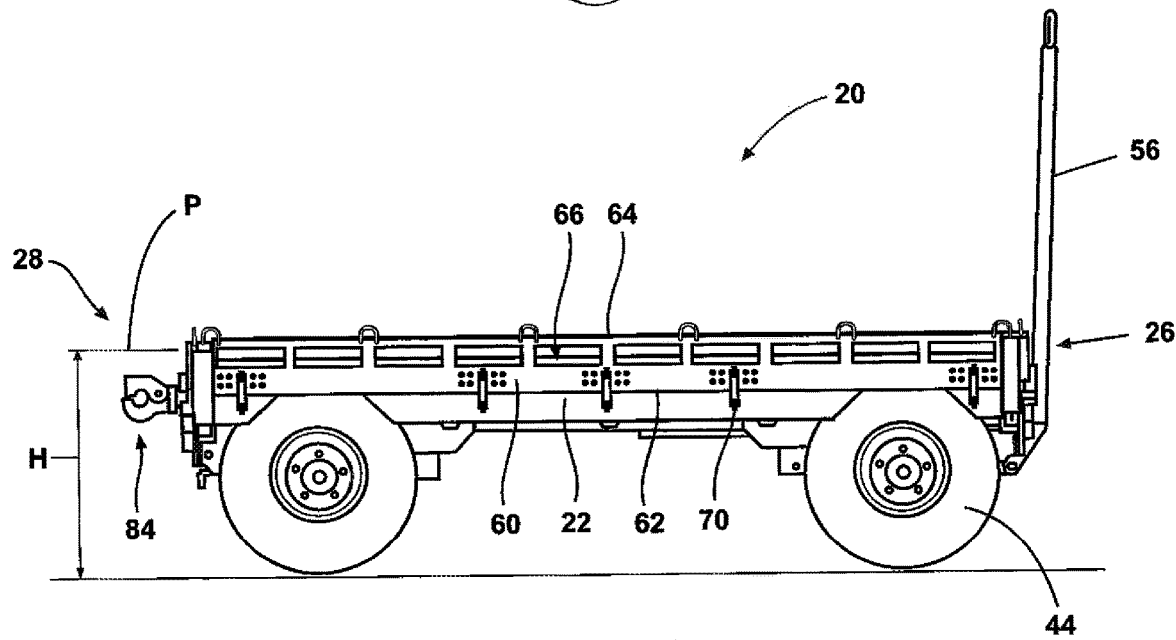
FIG. 4 is a side view of the pallet trailer shown in FIG. 1.
Figure 5:
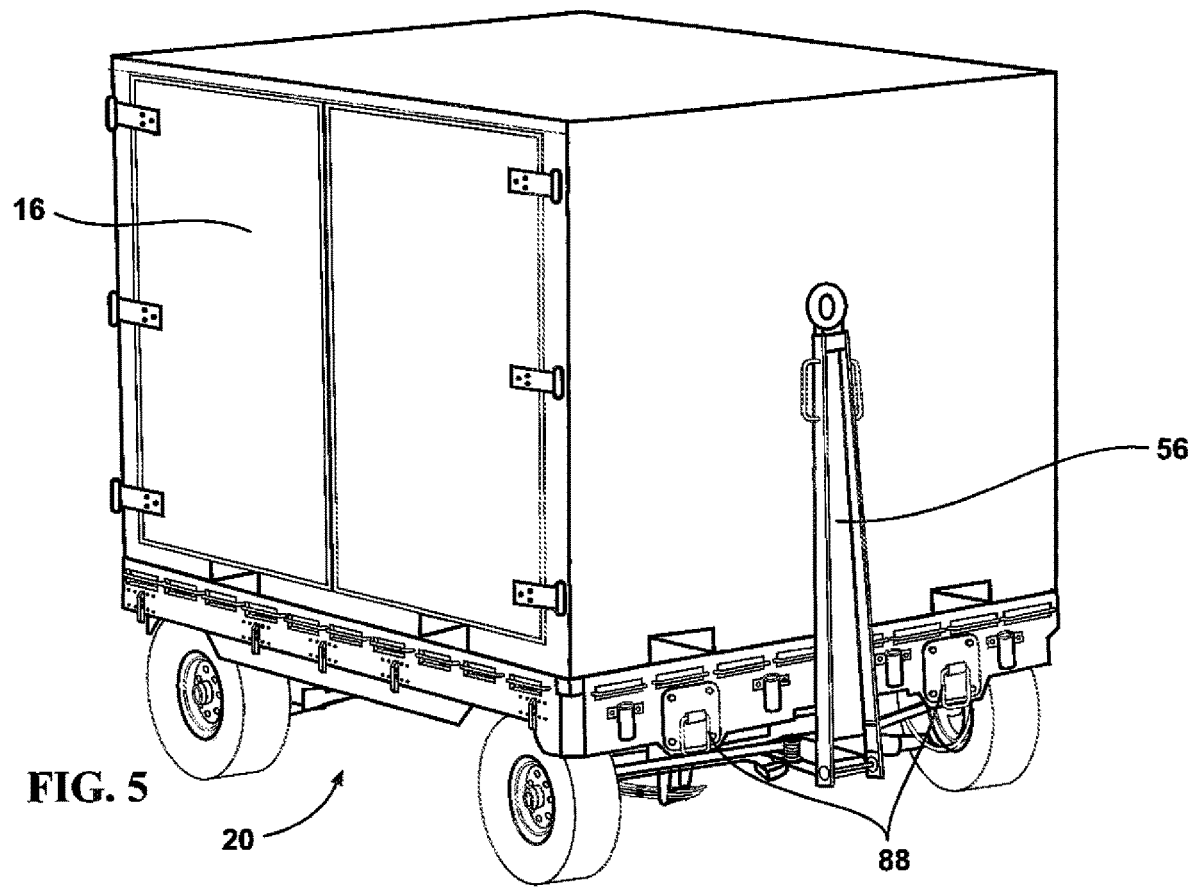
FIG. 5 is a perspective view of the pallet trailer shown in FIG. 1 with a container thereon.

It may be desirable for the pallet trailer 20 to have a relatively low profile for ease of loading and for occupying less vertical space in the cargo bay of an aircraft. As shown in FIG. 4, the height H from the ground to the top plane P of the deck may be less than about 30 inches. In one embodiment, the height H may be about 27 inches. This is useful when the pallet trailer 20 is, for example, used to carry a load such as a 90 inch tall ISU container 16 as shown in FIG. 5.

The pallet trailer 20 may further comprise a movable rail system joined to at least one of the sides of the deck 22. FIG. 1 shows that the rail system may comprise at least one fold-up rail 60 that has a proximal portion (or lower edge portion when folded up) 62 and a distal portion (or an upper edge portion when folded up) 64 that is movable between a pallet loading position and a pallet securing position. FIG. 1 shows that the rail 60 is positioned below the level of the forklift clearance channels 40 in the pallet loading position. FIG. 4 shows that the upper edge portion 64 of the rail 60 is disposed above the top plane P of the deck 22 in the pallet securing position. In the embodiment shown in the drawings, the fold-up rail system comprises four rails 60 in which one of the rails is joined to each side of the deck 22.

Figure 6:
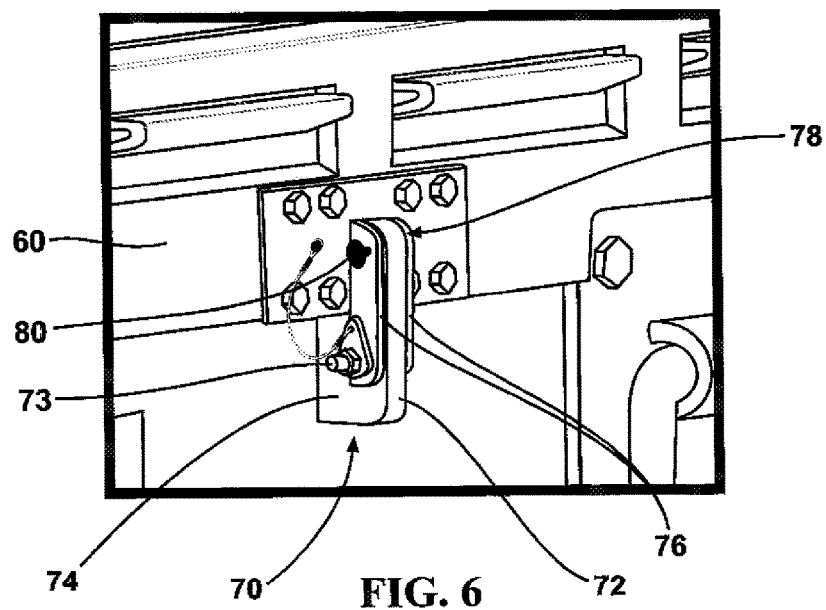
FIG. 6 is an enlarged perspective view showing one of the hinges of the fold up rails.

The rails 60 can have any suitable configuration. In the embodiment shown in the drawings, the rails 60 are each in the form of an elongated plate that has a plurality of spaced apart elongated, horizontally-oriented slots 66 therein sized and configured for receiving the horizontal tongues extending outward from the edges of a 463L pallet. The rails 60 can be joined to the trailer 20 in any suitable manner. FIG. 6 shows that in some embodiments, the rails 60 can be joined to the deck 22 with hinges 70 that allow the rails 60 to pivot between a folded down position and a folded up position. As shown in FIG. 6, the hinges 70 are joined to a member in the form of a protuberance 72 that is joined to the side of the deck 22 and extends outwardly therefrom. The protuberance 72 has flat-sides 74. The hinges 70 comprise a pair of arms 76 that are disposed adjacent opposite sides of the protuberance 72 and are pivotably joined thereto by a bolt 73 passing through the protuberance 72. The arms 76 are joined to the rail 60. The distal ends 78 of the arms 76 and the protuberance 72 have an opening therethrough, and a quick release pin 80 is insertable into the opening. The quick release pin 80 can be tethered to another portion of the hinge 70. There can be any suitable number of hinges 70 for joining the rails 60 to the deck 22. In the embodiment shown in the drawings, the front and rear 26 and 28 of the trailer 20 have four hinges for each of the rails 60 and the sides 36 of the deck 22 have five hinges for each of the rails.

FIG. 1 shows that the pallet trailer 20 may have a detachable drawbar 56 is joined to the front end 26 of the pallet trailer, such as to the front axle 48 (as shown in FIG. 3). The front end 26 of the pallet trailer 20 may have a recess 82 therein for stowing the detachable drawbar 56.

Figure 7:
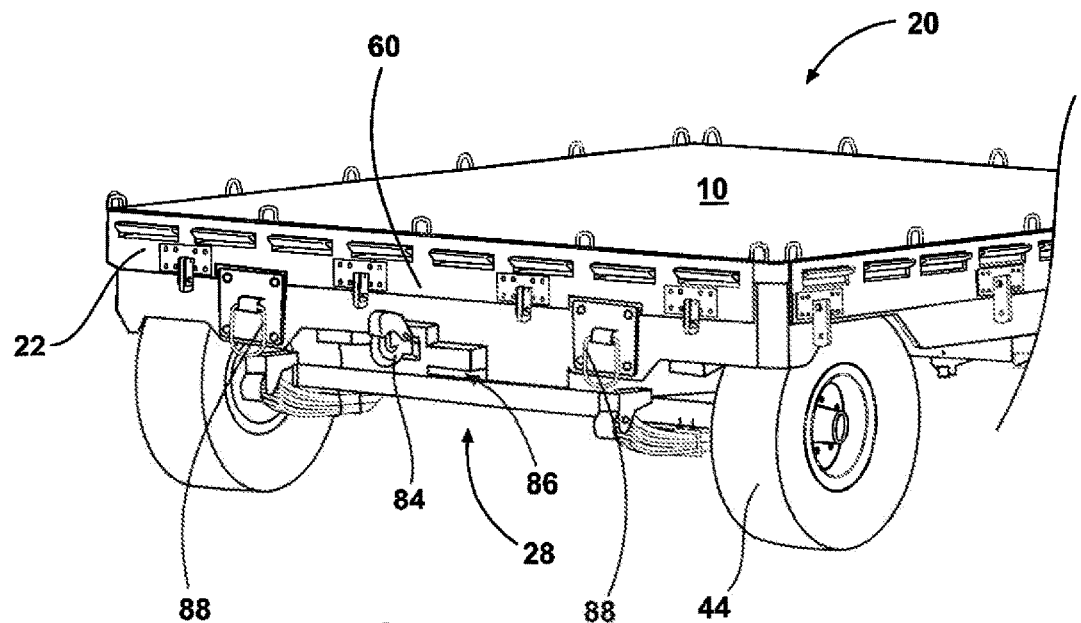
FIG. 7 is a perspective view of the rear of the trailer showing the trailer hitch.
Figure 8:
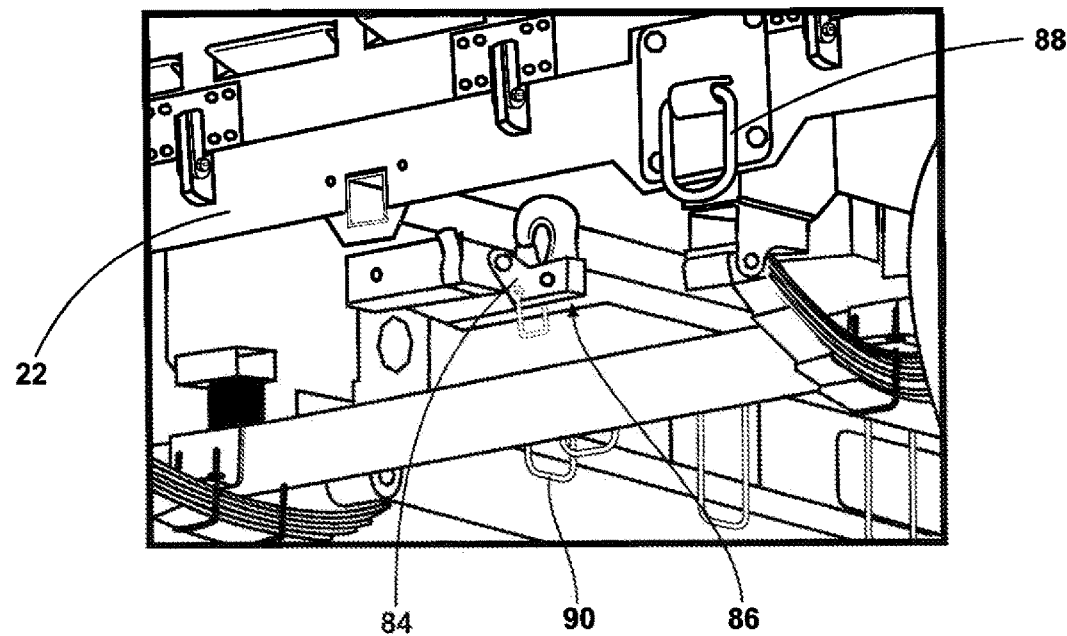
FIG. 8 is an enlarged perspective view of a portion of the rear of the trailer showing a receptacle for stowing the trailer hitch.

FIG. 4 shows that the pallet trailer 20 may further comprise a detachable towing hitch 84 joined to the rear end 28 of the pallet trailer 20. FIGS. 7 and 8 show that the rear end 28 of the pallet trailer 20 may have a recess 86 therein for storing the detachable towing hitch 84. The hitch 84 may comprise any known type of hitch. In the embodiment shown, the hitch 84 comprises a pintle hitch. The pallet trailer 20 may, therefore, be pintle hitch towable and can be towed in a string of multiple pallet trailers or other equipment.

The pallet trailer 20 may further comprise a plurality of pallet trailer tie down components. These tie down components can be used in addition to using the axles 48 and 50 as points of attachment for chains, straps, and the like, to secure the trailer 20 to the aircraft floor. FIGS. 5, 7, and 8 show that the pallet trailer 20 may further comprise a first group of pallet trailer tie down components 88 that are joined to the front and back sides of the deck 22. These tie down components 88 can be used to winch the trailer 20 onto the aircraft and to secure the trailer 20 to the aircraft floor. In the embodiment shown, the tie down components 88 are pivotable and can be turned downward and flush against the sides of the deck 22 when not in use.

Figure 9:
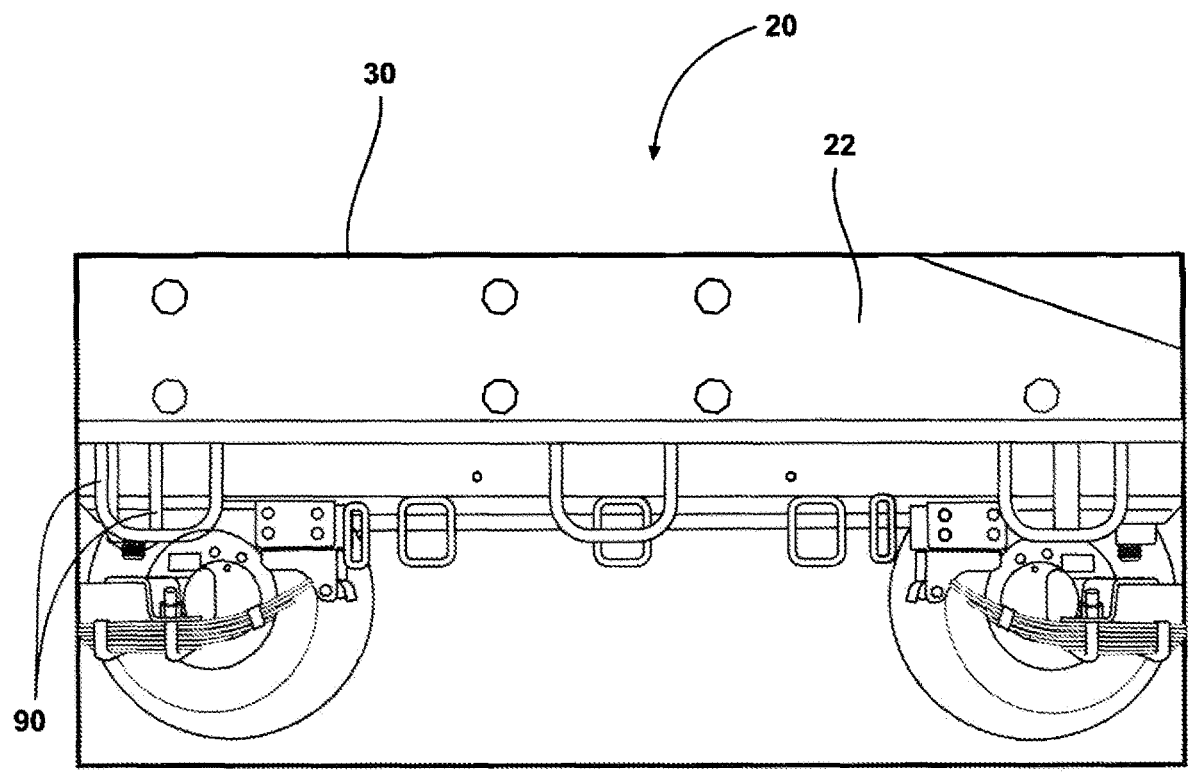
FIG. 9 is a perspective view of a portion of the side of the trailer showing the tie down connectors.

The pallet trailer 20 may also comprise a second group of pallet trailer tie down components 90 for tying down the pallet trailer 20 in the cargo bay when it is being transported on an aircraft. The trailer tie down components 90 may be used regardless of whether the pallet trailer 20 is loaded or unloaded. The pallet trailer tie down components 90 can be of any suitable configuration. FIGS. 8 and 9 show one embodiment in which the pallet trailer tie down components 90 comprise U-shaped chain rings joined underneath the pallet trailer deck 22. Other configurations are possible. The U-shape tiedown components are under the trailer 22 are mounted to the frame of the trailer. There can be any suitable number of pallet trailer tie down components 90. In the embodiment shown, there are three such chain rings mounted to each of the two main frame rails, and two chain rings mounted on each of two cross members.

The pallet trailer 20 can be used in any suitable manner. The pallet trailer is designed to have a 463L standard pallet lowered onto it with the channels 40 in the deck 22 providing relief for forklift forks. The pallet clamping system, comprised of ½" thick aluminum rails 60, swings up to capture the notched edges around all four sides of the 463L pallet, and can be locked in place with quick release pins 80, securing the pallet 10 to the trailer 20.

Once a load is secured to the pallet trailer 20, it can be transported on the ground, rolled onto a cargo aircraft for transport, rolled off at its destination, and transported on the ground again, all without the use of a forklift or other special material handling equipment.

When the pallet trailer is used on military cargo aircraft, the above-described materials and features are desirable. The one-piece aluminum deck for example, provides the strength requirements for handling 12,000 lb. up to 3 G's in the forward direction and meeting the empty trailer weight requirement of under 2,000 lbs. The deck height, foot print, load handling, and wheel base are design features intended for use on military cargo aircraft. Civilian uses of the pallet trailer described herein are also contemplated, however. Various changes can be made for civilian uses. Such changes include, but are not limited to changes in the dimensions of the deck 22 and changes to the tiedown points to accommodate civilian size pallets.

Figure 10:
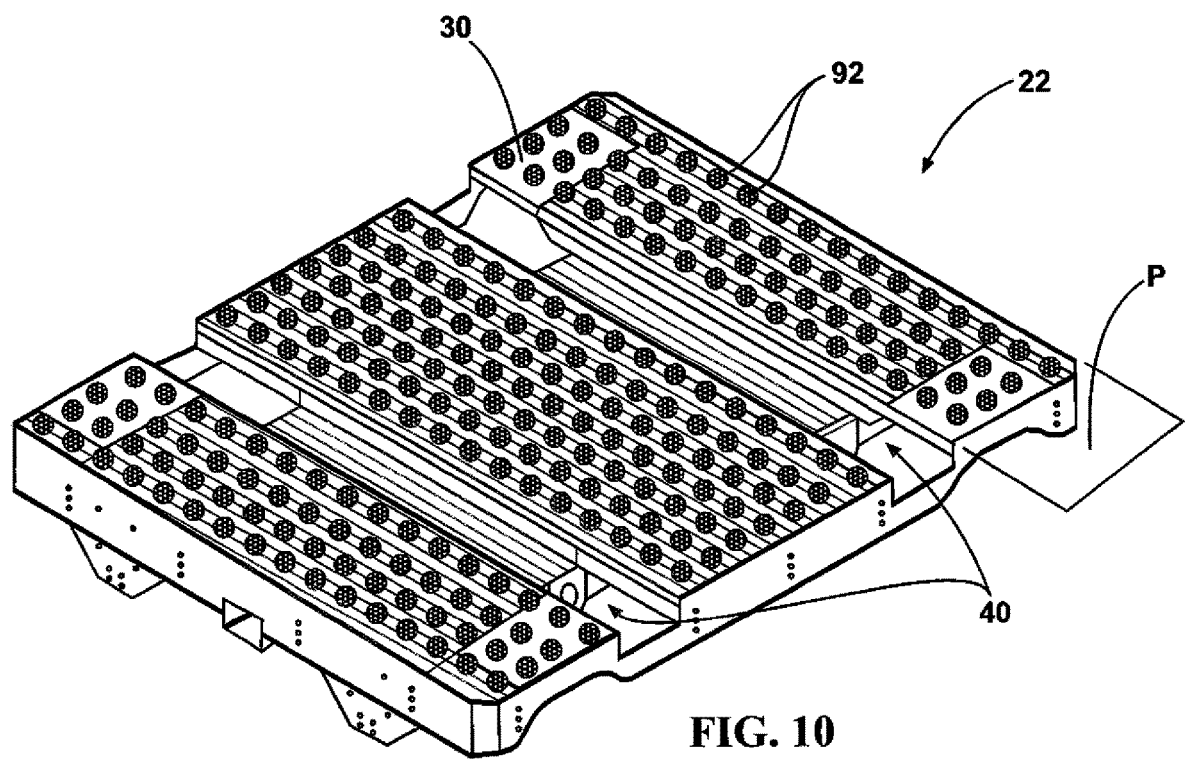
FIG. 10 is a schematic perspective view of an embodiment of the deck of the pallet trailer with a plurality of omni-direction rollers thereon.
Figure 11:
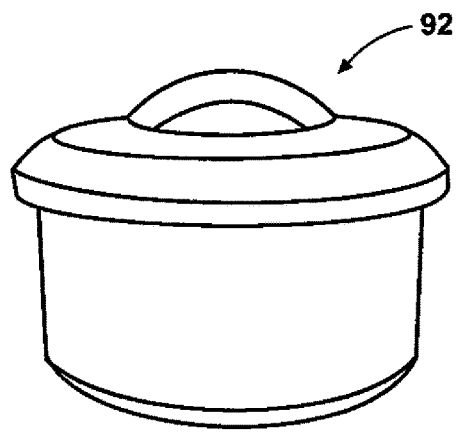
FIG. 11 is a perspective view of one of such omni-direction rollers.
Figure 12:
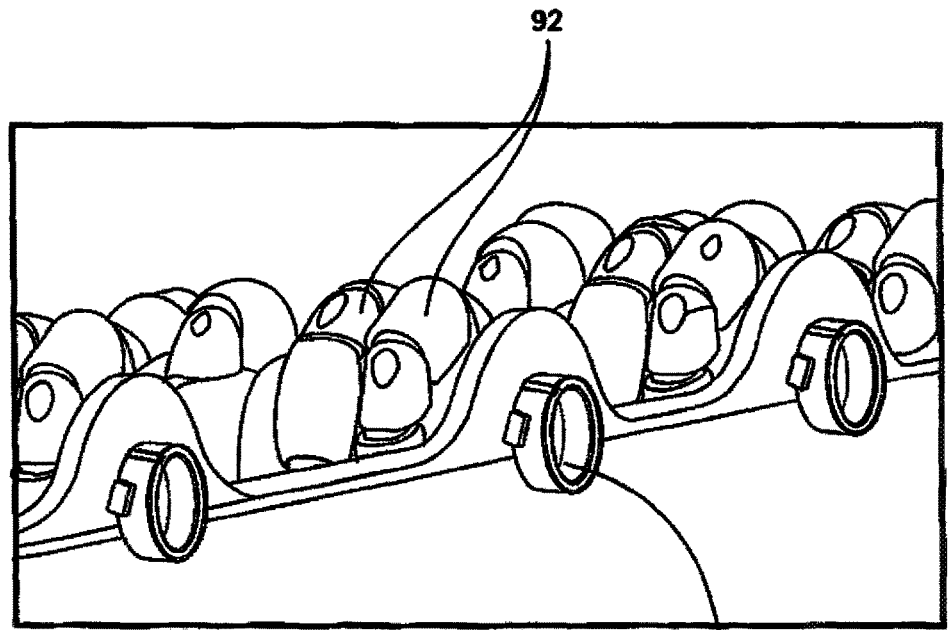
FIG. 12 is a perspective view showing plurality of a different type of omni-direction rollers.
Figure 13:
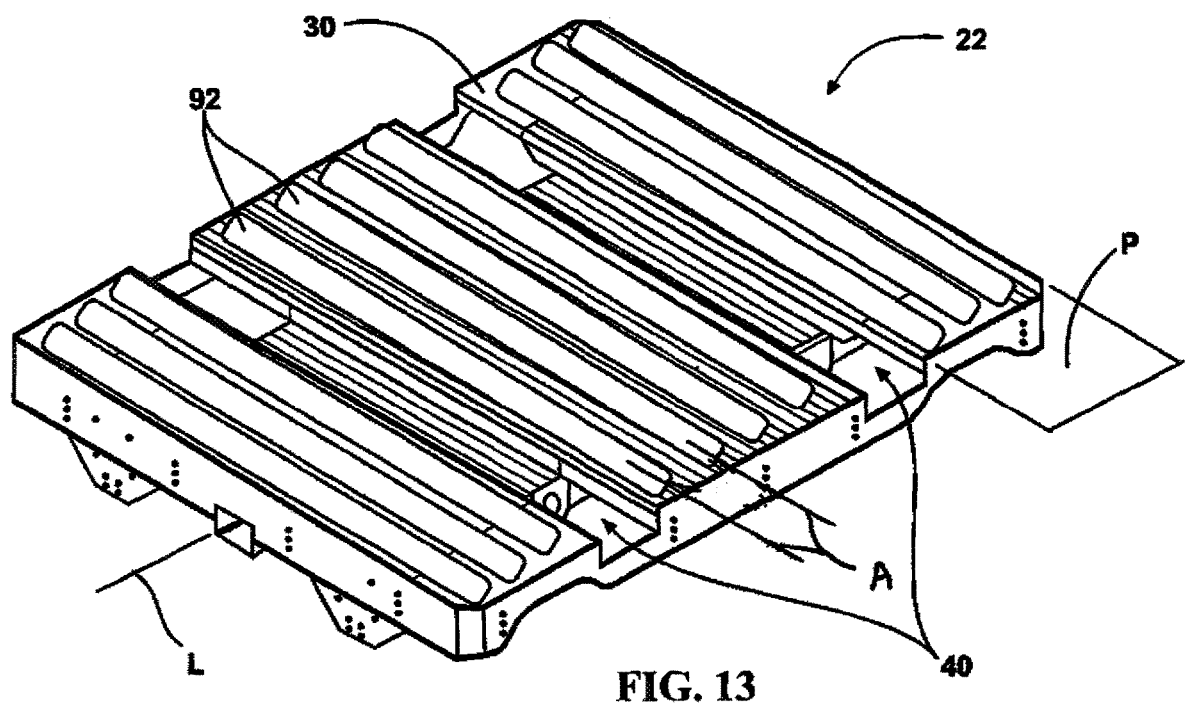
FIG. 13 is a schematic perspective view of an embodiment of the deck of the pallet trailer showing one possible arrangement of the omni-direction rollers shown in FIG. 12.

Various alternative embodiments of the pallet trailer 20 are possible. FIGS. 10 and 13 show that in some alternative embodiments, portions of the top surface 30 of the deck 22 lying in the top plane P of the deck 22 may have a plurality of rollers 92 rotatably joined thereto to allow the load to be more easily moved along the top surface 30 of the trailer. The rollers 92 are typically not placed in the forklift channels 40. The rollers 92 may be cylindrical, spherical or another suitable shape. The rollers 92 may be made of any suitable material including aluminum, other metals, alloys, and plastic. If the rollers 92 are cylindrical, they may be mounted on axles oriented either parallel to, perpendicular to, or at an oblique angle to the longitudinal centerline L of the trailer. FIG. 11 shows that the rollers 92 may comprise omni-directional rollers which are spherical and are mounted on an axis that runs through the center of the sphere. FIG. 12 shows another type of omni-directional rollers 92 that are mounted side-by-side on axles A. FIG. 13 shows that the rollers 92 in FIG. 12 may be mounted on axles A that are oriented perpendicular to the longitudinal centerline L of the trailer.

The pallet trailer described herein can provide a number of advantages. It should be understood, however, that these advantages need not be required unless they are set forth in the appended claims.

The trailer allows for pallets to be moved without the need of material handling equipment (MHE) such as forklifts and loaders. The trailer will reduce or supplement the need for MHE. The pallet trailer only takes up the space of a 463L pallet position and utilizes existing aircraft floor tie down system. The pallet trailer can be winched onto an aircraft without having to disassemble the pallets or hand carry equipment. It also allows for the equipment to be quickly loaded, downloaded and/or moved around by hand or truck once off the aircraft. This removes the need for MHE that is typically required to on/off-load 463L pallets and ISU's onto aircraft. This trailer will potentially save costs in reduced MHE requirements, save funds used to airlift MHE into locations without capabilities, and reduce stress on overworked airframes. The trailer also provides users the ability to move pallets without specialized material handling operators. All a user needs to do is connect the pallet trailer to a truck and tow it to the needed location. The trailer can also be used as a tool/parts bin. Commercial applications are the same as that of the military. Any civilian company transporting cargo could use the pallet trailer.

The term "joined", as used herein, encompasses configurations in which an element is directly secured to another element by affixing the element directly to the other element; configurations in which the element is indirectly secured to the other element by affixing the element to intermediate member(s) which in turn are affixed to the other element; and configurations in which one element is integral with another element, i.e., one element is essentially part of the other element. The term "joined" includes both those configurations in which an element is temporarily joined to another element, or in which an element is permanently joined to another element.

It should be understood that every maximum numerical limitation given throughout this specification includes every lower numerical limitation, as if such lower numerical limitations were expressly written herein. Every minimum numerical limitation given throughout this specification includes every higher numerical limitation, as if such higher numerical limitations were expressly written herein. Every numerical range given throughout this specification includes every narrower numerical range that falls within such broader numerical range, as if such narrower numerical ranges were all expressly written herein.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A pallet trailer comprising:
   a deck having a top, a bottom, and sides, wherein the top of the deck comprises an uppermost portion that lies in a top plane wherein the top of the deck has at least one pair of spaced apart forklift clearance channels therein that are disposed below the top plane of the deck and extend inward from at least one of the sides of the deck;
   a plurality of wheels located underneath the bottom of the deck, wherein said wheels are rotatable on axles that are joined at least indirectly to the bottom of the deck; and
   a fold-up rail system joined to at least one of the sides of the deck, said fold-up rail system comprising at least one rail that comprises an elongated plate which has an upper edge portion that is movable between a pallet loading position to a pallet securing position, wherein the rail is positioned below a level of the forklift clearance channels in the pallet loading position, and the upper edge portion of the elongated plate is disposed above the top plane of the deck in the pallet securing position.

2. The pallet trailer of claim 1 wherein the deck has a rectangular plan view configuration with four sides, said sides comprising a first pair of opposing sides and a second pair of opposing sides, wherein the forklift clearance channels extend between one pair of opposing sides.

3. The pallet trailer of claim 2 having a front end, a rear end, and a longitudinal centerline running between the front end and the rear end, wherein the channels are oriented perpendicular to the longitudinal centerline.

4. The pallet trailer of claim 1 having a front end, a rear end, and the deck has a length between the front and rear ends, and the plurality of wheels comprise two front wheels closest to the front end of the pallet trailer and two rear wheels closest to the rear end of the pallet trailer, wherein the elongated plate extends along the length of the pallet trailer at least from the front wheels to the rear wheels.

5. The pallet trailer of claim 4 for use with a pallet that has edges and horizontal tongues extending outward from the edges of the pallet, wherein the elongated plate has a plurality of spaced apart elongated, horizontally-oriented slots therein sized and configured for receiving the horizontal tongues extending outward from the edges of a pallet.

6. The pallet trailer of claim 4 wherein the elongated plate extends along the entire length of the deck of the pallet trailer.

7. The pallet trailer of claim 1 wherein said at least one rail is joined to a side of the deck by a hinge, wherein a portion of said hinge has an opening therethrough, and a quick release pin is insertable into said opening.

8. The pallet trailer of claim 1 wherein said fold up rail system comprises four rails wherein each of said rails comprises an elongated plate that is joined to a side of the deck.

9. The pallet trailer of claim 1 wherein at least a portion of the top plane of the deck has a plurality of rollers rotatably joined thereto.

10. The pallet trailer of claim 9 wherein said rollers comprise omni-directional rollers.

11. The pallet trailer of claim 1 having a front end and a rear end, wherein a detachable drawbar is joined to the front end of said pallet trailer, and the front end of the pallet trailer has a recess therein for storing said detachable drawbar.

12. The pallet trailer of claim 1 having a front end and a rear end, said pallet trailer further comprising a detachable towing hitch joined to the rear end of said pallet trailer, and the rear end of the pallet trailer has a recess therein for storing said detachable towing hitch.

13. The pallet trailer of claim 12 wherein said detachable towing hitch comprises a pintle hitch.

14. The pallet trailer of claim 1 wherein the sides of the deck comprise a pair of opposed longitudinal sides and front and back sides, and the pallet trailer further comprises a plurality of pallet tie down components joined to the front and back sides of said deck, wherein said tie down components comprise rings having an open center, which are pivotable and can be turned downward and flush against the front and back sides of the deck when not in use.

* * * * *